United States Patent
Stacer et al.

(10) Patent No.: US 7,591,127 B1
(45) Date of Patent: Sep. 22, 2009

(54) GRAIN HARVESTER HEADER WITH AIR ASSIST

(76) Inventors: Daryl J. Stacer, 210 Romain Rd., Apt. 202, Caro, MI (US) 48723; James R. Stacer, 4945 Section Line Rd., Harbor Beach, MI (US) 48441

( * ) Notice: Subject to any disclaimer, the term of this patent is extended or adjusted under 35 U.S.C. 154(b) by 86 days.

(21) Appl. No.: 11/858,893

(22) Filed: Sep. 20, 2007

Related U.S. Application Data

(60) Provisional application No. 60/846,186, filed on Sep. 20, 2006.

(51) Int. Cl.
*A01D 46/00* (2006.01)
(52) U.S. Cl. .......................................... 56/12.9; 56/313
(58) Field of Classification Search ......... 56/12.8–13.1, 56/297–303, 305, 307–313
See application file for complete search history.

(56) References Cited

U.S. PATENT DOCUMENTS

| | | | |
|---|---|---|---|
| 115,411 A * | 5/1871 | Anderson | 56/313 |
| 749,375 A * | 1/1904 | Glaze | 56/313 |
| 859,602 A * | 7/1907 | Green | 56/296 |
| 2,054,161 A | 9/1936 | Leonard | |
| 2,670,586 A | 3/1954 | Phillips | |
| 2,718,744 A | 9/1955 | Phillips | |
| 2,734,331 A | 2/1956 | Phillips | |
| 2,737,006 A | 3/1956 | Klingler | |
| 3,982,383 A | 9/1976 | Mott | |
| 4,091,602 A | 5/1978 | Williams et al. | |
| 4,783,951 A | 11/1988 | Richards et al. | |
| 5,809,759 A | 9/1998 | Zyla et al. | |
| 5,924,270 A * | 7/1999 | Bruns | 56/320.1 |
| 6,085,510 A | 7/2000 | McDonnell | |
| 6,782,683 B2 | 8/2004 | Buermann | |

* cited by examiner

*Primary Examiner*—Alicia M Torres
(74) *Attorney, Agent, or Firm*—Robert L. Farris; Farris Law, P.C.

(57) ABSTRACT

The crop lifter and air assist feeding assembly for a floating cutter bar header includes a lower tube that is generally horizontal. An upper tube is fixed to the front end of the horizontal tube and extends upwardly and rearwardly to an air discharge orifice. A vine lifting rod is attached to the upper tube. The lower tube is mounted under a knife guard. A skid plate connected to the cutter bar has an attached terminal air supply tube. The terminal air supply tube passes through a front portion of the skid plate and attaches to the lower tube. An elastic and flexible tube is positioned above the skid plate, and is connected to the terminal supply tube and to terminal air supply tube and a blower air delivery tube under the skid plate.

12 Claims, 5 Drawing Sheets

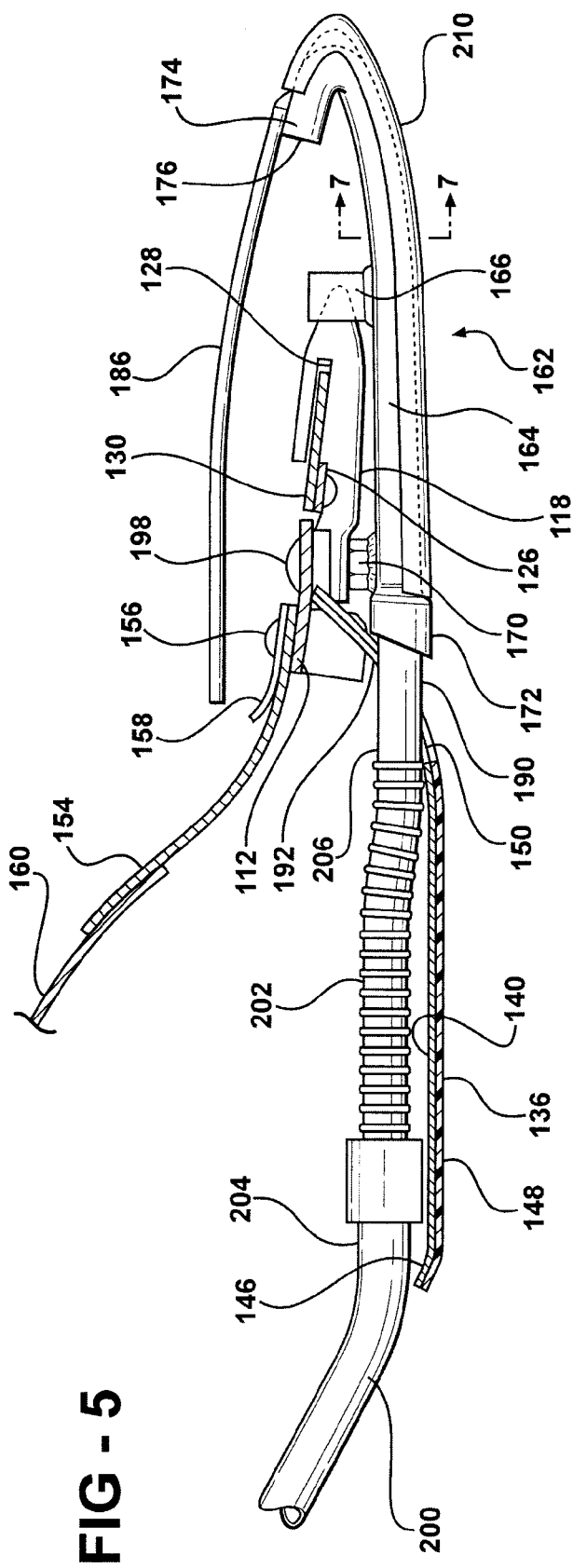
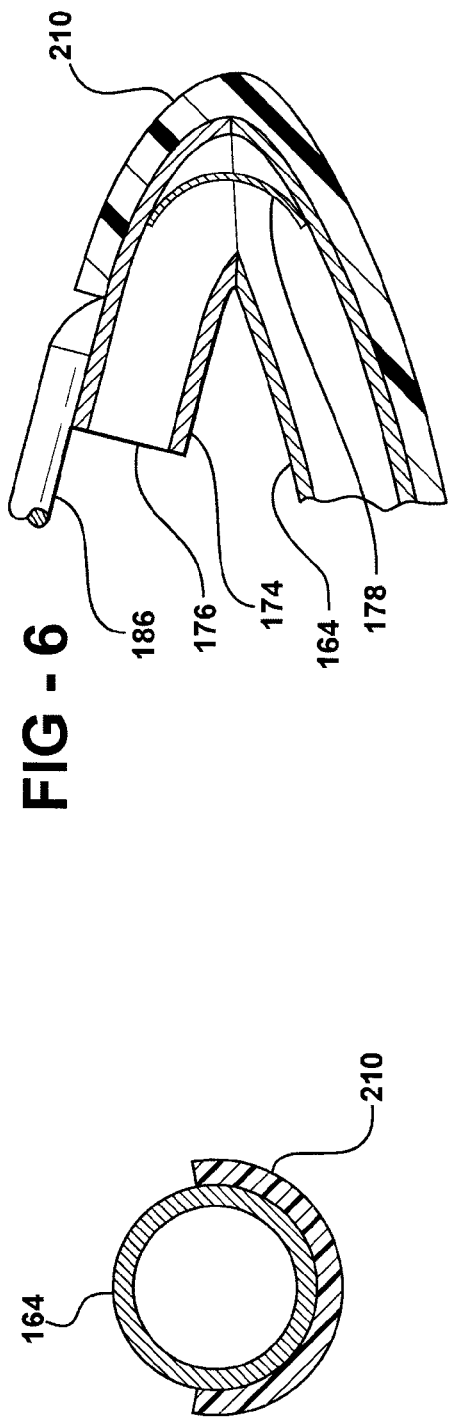

GRAIN HARVESTER HEADER WITH AIR ASSIST

CROSS REFERENCE TO RELATED APPLICATIONS

This application claims the benefit of the filing date of U.S. Provisional Application No. 60/846,186 titled GRAIN HARVESTER HEADER WITH AIR ASSIST, filed Sep. 20, 2006.

TECHNICAL FIELD

The grain harvester header employs air nozzles in combination with a conventional reel to move crop material into a conveyor behind the cutter knife and reduce grain loss.

BACKGROUND OF THE INVENTION

Headers for combine harvesters sever crop material from the ground and convey the crop material to threshing, separating and cleaning assemblies. The headers used depend upon the crop to be harvested, farming practices employed and growing conditions.

Headers with a knife and guards for severing crop material from the ground are employed to harvest a number of different crops. The reciprocating knife has sections with cutting edges that cooperate with guards to shear crop material. A reel urges severed crop material toward a conveyor that conveys the severed crop material toward a thrashing assembly. The reel separates some seeds from the crop material. The knife sections move plant stalks toward the sides of guards and shake the plants. The shaking separates more seeds from the crop material. A substantial portion of the loose grain lands on the header or the knife due in part to forward movement of the header. If there is a substantial quantity of crop straw moving toward a header conveyor, a portion of the loose grain is carried by the straw to the thrashing assembly.

Crops such as wheat, rye and barley can generally be cut by the knife several inches above the ground. A portion of the loose grain separated by the reel and shaking by the reciprocating knife will slide into a header auger conveyor if the crop is cut several inches above the ground. When the knife is lowered to cut crop material as low as possible loose grain can slide forward and out of the header. The crop straw of some crops is relatively sticky and will sit on a header between the knife and the auger conveyor. Moving such material to the rear from the knife is a problem in some crop conditions.

Crops such as beans have pods that hold bean seeds. Bean pods grow on the stalks of most bean plants from near the top of the plant down to the ground. The pods near the ground and any seeds they contained are difficult to save. With beans like pintos and white beans for example, the plants are generally severed from their roots under the ground and then picked up with a pickup attachment on a combine. The attachment has some seed shatter loss. Occasionally wind will blow bean plants away after they are severed from their roots and before they are picked up. The severing process is an expensive additional operation.

Flexible headers have a cutter assembly that is able to flex up and down a few inches and follow the ground contour. Floating cutter bars move up and down over a larger vertical range than flexible headers. At least some floating cutter bars have plates that bridge a gap between a cutter assembly and an auger trough. These plates can lose some grain.

The flexible header and the floating cutter assembly both have a flat steel bar that extends from one end of the header to the other end. The flat steel bar is connected to the header frame by various structures. Sickle guards are bolted to a forward edge of the flat bar by bolts. Some guards have a single forwardly projecting member with a sickle section passage slot and a pointed forward tip. The rear portion of the guard extends under the flat bar and has an aperture that receives a bolt. The bolt clamps the guard to the bottom surface of the flat bar. Other guards have two forwardly projecting members with sickle section passages and forwardly projecting points. The rear portions of the two forwardly projecting members are connected by a transverse rib that is under the flat bar. Two bolts clamp a guard, with two forwardly projecting members, to the bottom of the flat bar. Guards with three forwardly projecting members are also employed on some headers. Rigid headers have an angle iron fixed to the lower forward portion of the header frame. The guards discussed above are clamped to the angle iron.

Air reels have been used in the past. Most air reels replace the bat reels or pickup reels with fingers that are used on headers for most small grain crops. Air reels generally have a horizontal tube supported by arms on the ends of a header that normally supports a driven reel shaft. A number of tubes extend downward from the horizontal tube and have nozzles on their lower ends that direct air downward and rearward toward the header conveyor. The horizontal tube is adjustable relative to the reel support arms in a fore and aft direction. The horizontal tube is also adjustable vertically by standard header reel lift cylinders. The nozzles on the lower ends of the vertical tubes are normally forward of and above the sickle guards. Air is directed to the nozzles from a blower through a pipe to the horizontal tube to the vertical tubes and to the nozzles. These air reels have been effective in short crop material. They generally do not do well in heavy crop material.

Attempts have been made to combine an air reel with a bat reel. The bat reel interferes with the air jets from the air nozzles and limit adjustment of the position of the nozzles. The reel and air nozzle combination also obstructs a harvester operator's view of the crop in front of the harvester. This can be a problem in fields with some rocks on the surface.

The connection between the guards and sickle assembly and the header will hold some seeds. Moving seeds caught by the header structure between the guards and the header conveyor can be difficult. An air stream close to the upper surface of the sickle sections can move seeds to the header conveyor. Air reels supported by reel support arms on the lateral ends of a header have had limited success saving free seeds that are held by the header structure forward of the header conveyor.

Most crop material that is dry for thrashing and that has been severed from the plant roots is relatively light weight and can be moved by a moderate wind. Wind will blow crop material with attached seeds out of a header at times. Some known air reels increase the problem thereby increasing grain losses in windy conditions.

SUMMARY OF THE INVENTION

The crop lifter and air assist feeding assembly is for use on a floating cutter bar header. The crop lifter and air assist feeding assembly includes a lower tube that is generally horizontal and an upper tube that is integral with a forward end of the lower tube. The upper tube extends rearwardly and upwardly to an air discharge orifice. A vine lifting rod is attached to the upper tube. The vine lifting rod extends rearwardly and upwardly from the air discharge orifice. A diffuser is secured to the lower tube and the upper tube. The diffuser includes a pair of space apart vertical plates. These plates have their forward ends positioned at the air discharge orifice. The plates extend rearwardly from the air discharge orifice and laterally outward away from each other. A top plate is integral with an upper edge of each of the pair of spaced apart vertical plates and extends upward and rearward from the air discharge orifice. A vertical tongue with a crop lifter support bore is attached to the lower tube and extends upward from the lower tube. A threaded vertical bore is integral with a rear portion of the lower tube. The threaded vertical bore can be a nut welded to the lower tube or a threaded bore through the lower tube wall. A rear air inlet collar is integral with the lower tube.

A knife guard has a guard forward tip received in the crop lifter support bore. A lower tube retainer bolt passes through a flexible cutter bar and the knife guard and screws into the threaded vertical bore and clamps the lower tube to the cutter bar.

A skid plate assembly is clamped to the cutter bar. A terminal air supply tube is connected to the skid plate assembly. The terminal air supply tube passes through an upturned front section of the skid plate assembly. A terminal air supply forward end is telescopically connected to the rear air inlet collar on the lower tube, an elastic and flexible tube, positioned above the skid plate assembly. A flexible tube forward end is connected to an air receiving end of the terminal air supply tube. A flexible tube rear end is connected to a blower air delivery tube forward of an upturned rear section of the skid plate assembly.

The crop lifter and air assist feeding assembly may include an air deflector in the forward end of the lower tube. The air deflector changes the direction of movement of air moving from the lower tube to the upper tube.

A plastic jacket that covers a portion of the downwardly facing outer surfaces of the lower tube and a portion of upwardly facing outer surfaces of the upper tube may be employed to protect the lower tube and the upper tube from wear or to prevent moist soils from sticking to the lower tube and the upper tube.

BRIEF DESCRIPTION OF THE DRAWINGS

The presently preferred embodiment of the invention is disclosed in the following description and in the accompanying drawings, wherein:

FIG. 5 is a vertical fore and aft sectional view of a floating cutter bar and a crop lifter and air assist feeding assembly with parts broken away;

FIG. 6 is an enlarged vertical fore and aft view of the crop lifter and air assist feeding assembly with parts broken away; and FIG. 7 is an enlarged sectional view taken along line 7-7 in FIG. 5.

DETAILED DESCRIPTION OF THE PREFERRED EMBODIMENTS

Figure 1:
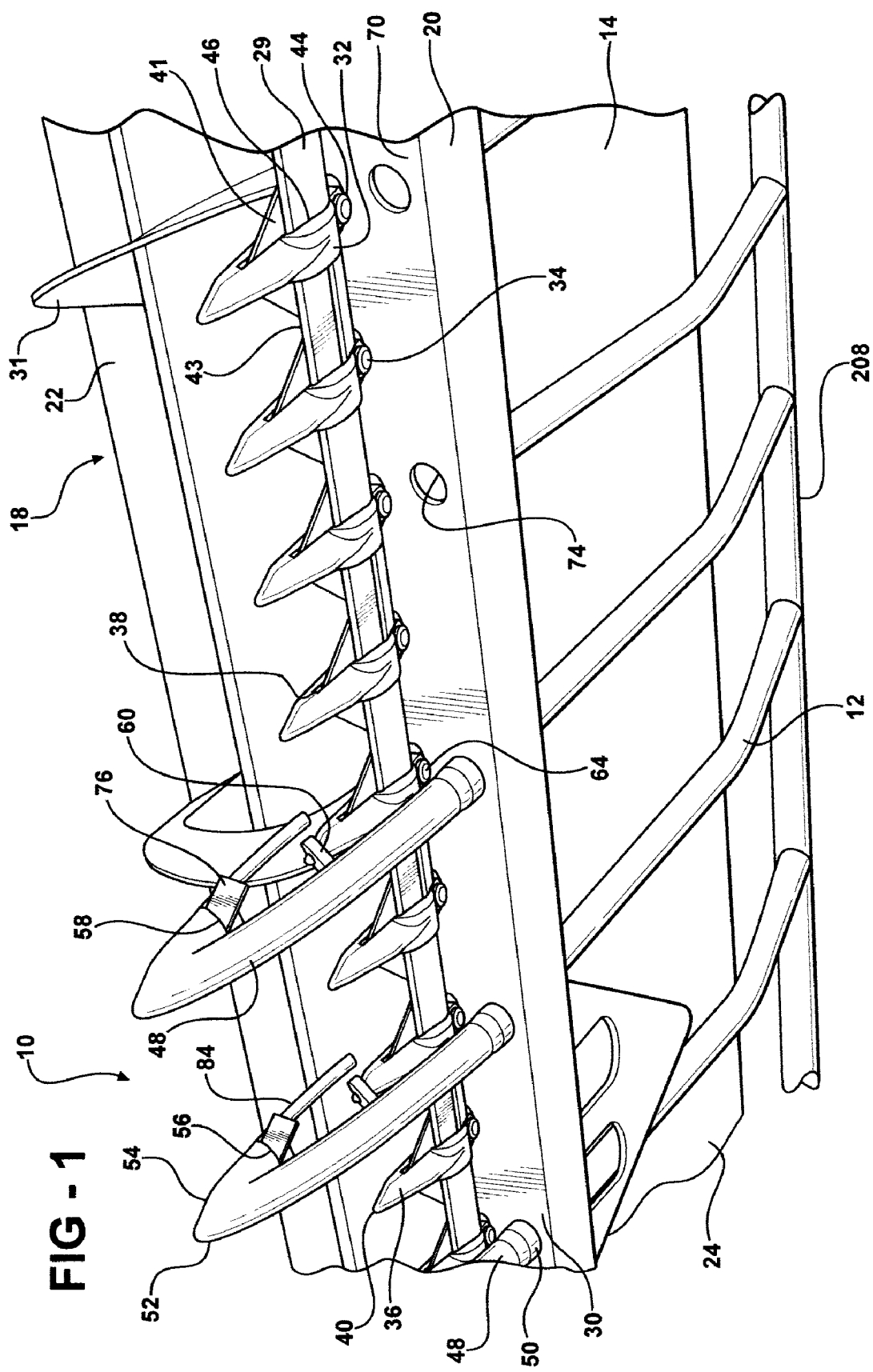
FIG. 1 is a perspective view of a combination crop lifter and air assist feeding assembly mounted on a rigid cutter bar header with parts broken away.
Figure 2:
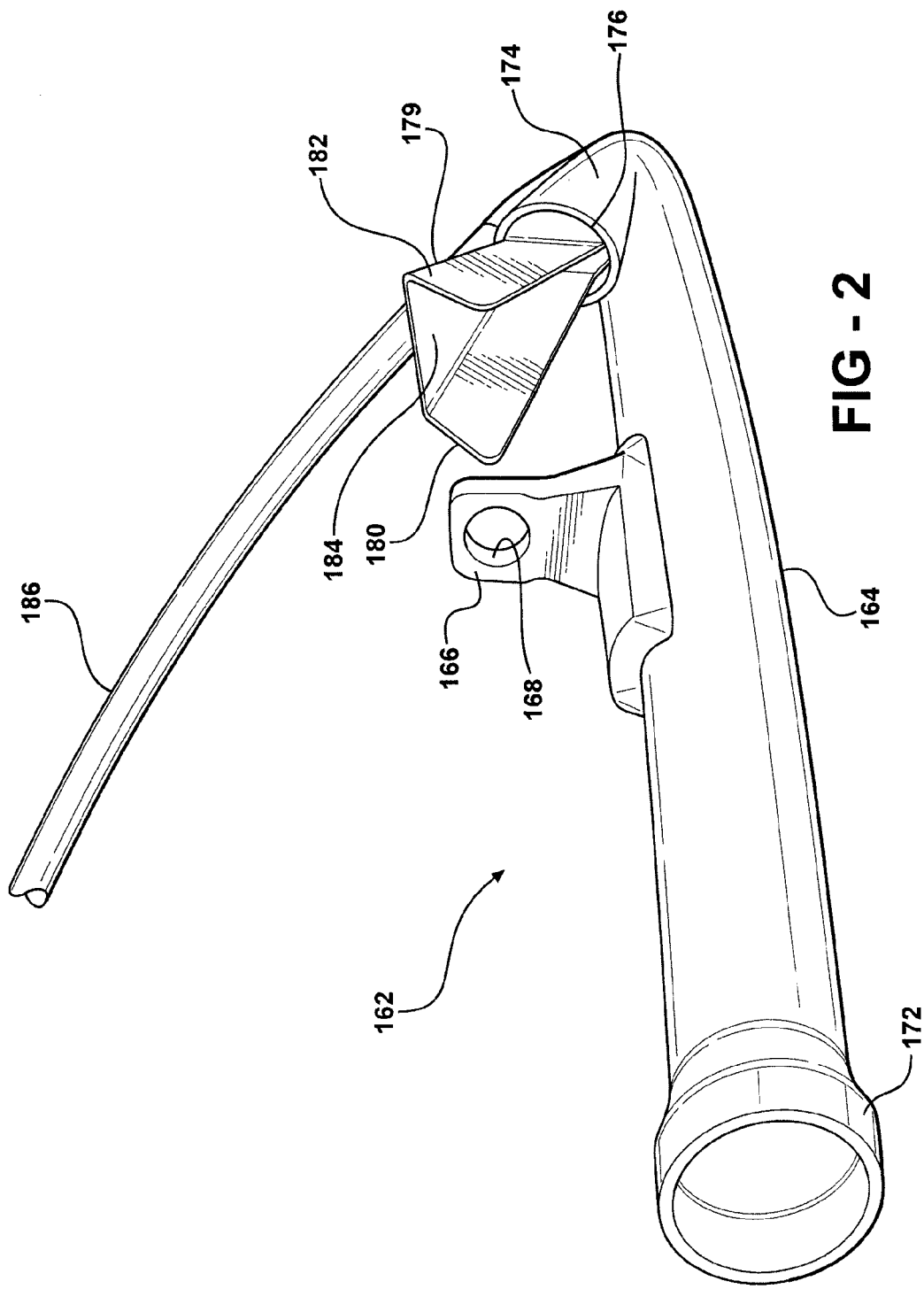
FIG. 2 is an enlarged perspective view of a combination crop lifter and air assist feeding assembly.
Figure 3:
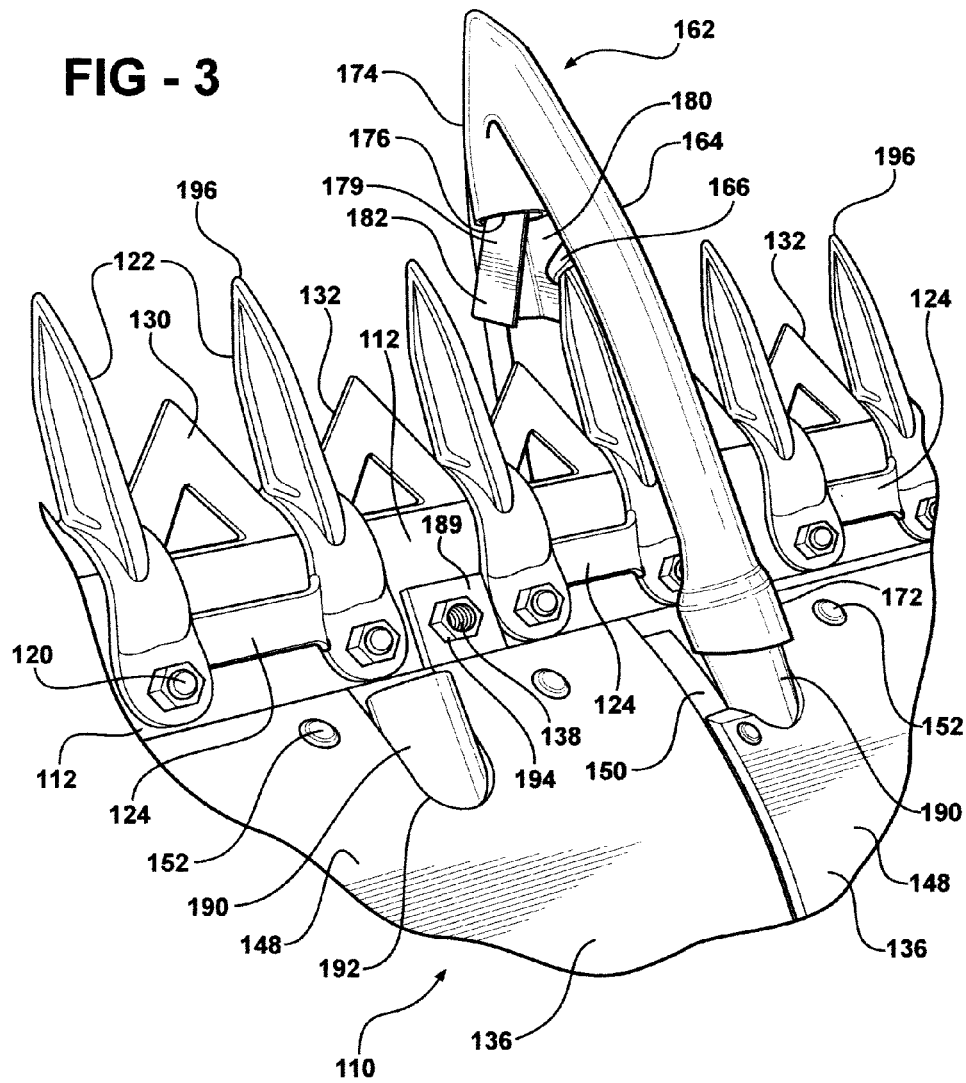
FIG. 3 is a perspective bottom view of a crop lifter and air assist feeding assembly mounted on a floating cutter bar header with parts broken away.
Figure 4:
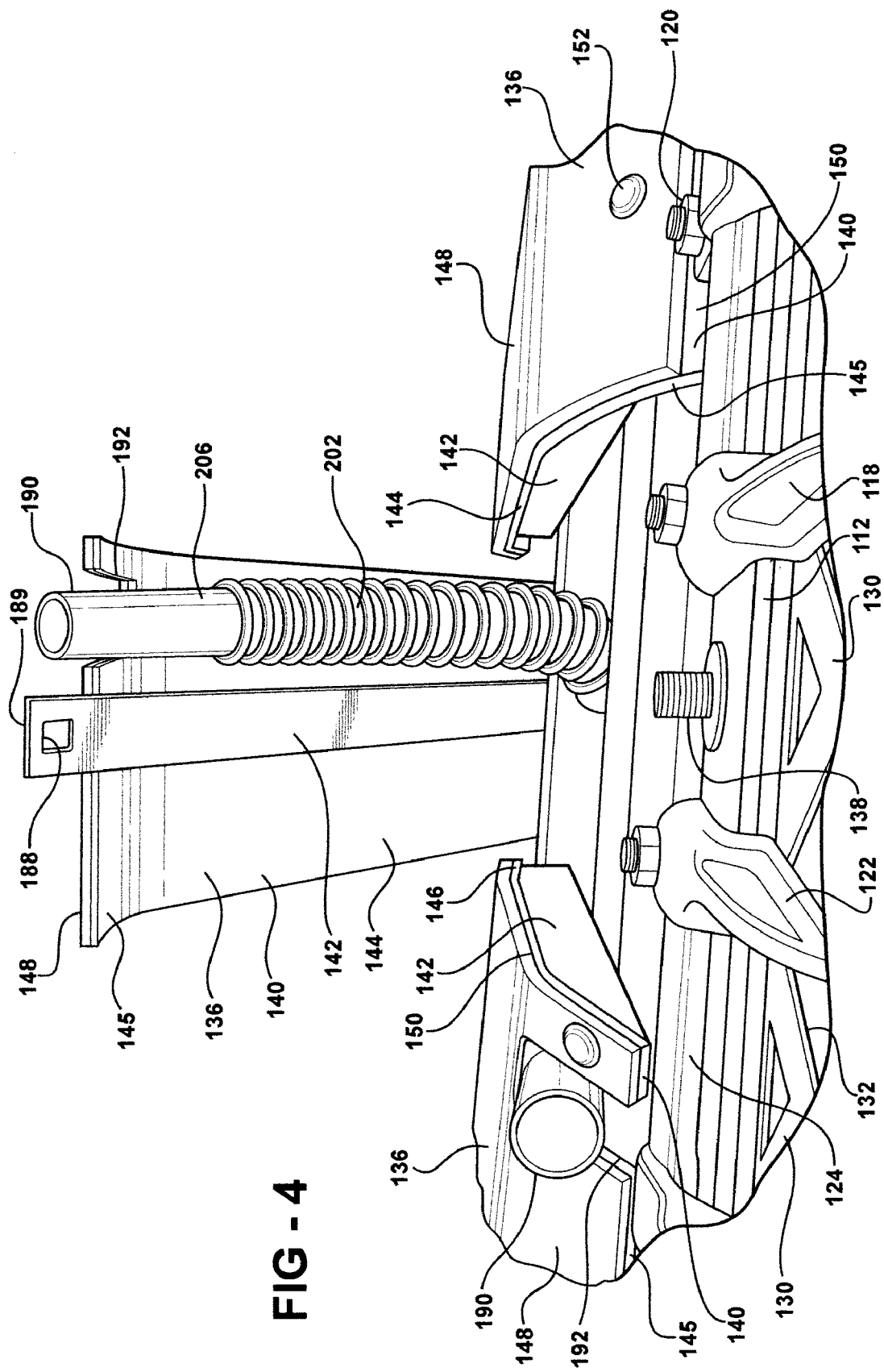
FIG. 4 is a perspective view of the bottom of a floating cutter bar header with one skid plate assembly pivoted to a disassembled position to show the elastic and flexible tube for air delivery and the upper portion of one skid plate assembly with parts broke away.

The crop lifter with air assist feeding includes a tubular crop lifter assembly 10 intermediate tubes 12 attached to a header bottom 14 for supplying air to each tubular crop lifter assembly 10, flexible tubes for supplying air under pressure to each intermediate tube 12, and a pressure blower for supplying air to each flexible tube. The crop lifter assembly 10, shown in FIG. 1, is attached to a rigid combine header 18. The combine header 18 includes a frame 20. The frame 20 supports a rear wall 22, a floor 24, a left end wall and a right end wall. A sickle support bar 30 is part of the frame 20. The front edge of the floor is attached to the sickle support bar 30. The support bar 30 extends from the left end wall to the right end wall. On most combine headers, the support bar 30 extends through both the left and the right end walls a short distance.

The floor 24 forms an auger trough. An auger conveyor 31 moves crop material from the end walls and discharges crop material rearward through the center of the rear wall 22.

A plurality of sickle guards 32 are clamped to a downwardly facing surface on the sickle support bar 30 by carriage bolts 34. The guards 32 have a fore and aft extending body 36 with a transverse horizontal knife section slot 38 and a forward pointed end 40. A transverse bar is integral with and extends between two adjacent fore and aft extending bodies 36. Vertical bores through the rear of each body 36 receive the carriage bolts 34. Nuts 44 are received on the bottom of each carriage bolt 34 and clamp an upwardly facing guard surface 46 to the support bar 30.

A knife 29 includes sickle sections 41 attached to a knife bar 43 by rivets or bolts. A knife drive (not shown) drives the knife bar 43 and reciprocates the sickle sections back and forth between the section slots 38 in two adjacent sickle guard 32 fore and aft extending bodies 36.

Each tubular crop lifter assembly 10 includes a lower tube 48. The lower tube 48 is bowed upward from the rear end 50 to the forward tip 52. The bow from the forward tip 52, to the rear end 50 is an arc with substantial radius. The forward tip 52, as shown in FIG. 1 is an arc with a smaller radius. The radius of the forward tip 52 is nearly equal to the inside radius of the lower tube 48. A second tube 54 intersects the forward tip 52 of the lower tube 48 at an acute angle and is fixed to the lower tube by welding. The rear end 56 of the second tube 54 is an air discharge nozzle 58. A ring member 60 is attached to the top of the lower tube 48 some distance to the rear of the discharge nozzle 58. The ring member 60 can be clamped to the top of the lower tube 48 by a mechanical fastener. The ring member 60 could also be fixed to the lower tube by another procedure including welding. A nut is welded to the top of the lower tube 48 forward of the rear end 50 of the lower tube. A threaded bore in the lower tube 48 can be used in place of the nut.

The tubular crop lifter assembly 10 is connected to a sickle guard 32 by removing a carriage bolt 34, inserting the ring member 60 welded to the tube 48 over the forward pointed end 40 of a fore and aft extending body 36 of a guard 32. A bolt 64 is inserted down through the carriage bolt bore and screws into the nut welded to the lower tube 48. The bolt 64 is tightened to clamp a sickle guard 32 and the crop lifter assembly 10 to the support bar.

The nut can be eliminated if desired and replaced by a clamp plate that is attached to carriage bolts 34 behind adjacent fore and aft extending bodies 36. The clamp plate can be welded to the lower tube 48 of a crop lifter assembly 10.

The lower tube 48 of a crop lifter assembly 10 is generally the lowest structure on a harvester header 18 when the header is cutting crop material as low as possible. The center portion of the lower tube 48 is bent to change the cross section of the tube between the ring member 60 and the nut from a circle to an ellipse thereby increasing the horizontal width and reducing the vertical height of the lower tube 48. The decreased vertical height permits the header 14 to sever plants a little closer to the ground and save a few more seeds. Since the lower tube 48 is the closest member to the ground, it is covered by a harder material or heat treated to increase hardness and reduce wear when sliding on the ground. Wear could be decreased by a plastic low friction long-life wear plate or coating.

The forward tip 52 of the tubular crop lifter assembly 10 is close to the ground when in use. In this position crop material is raised as the header moves forward and before the plants are severed. The air discharge nozzle 58 includes vanes 76 to direct a portion of the air discharged to the left and rearward, a portion of the air discharged to the right, and rearward, and let some air continue moving directly to the rear. The air discharged from the discharge nozzles 58 carries grain and other crop material rearward and into the auger conveyor 31.

The lower tube 48 and the second tube 54 cooperate with each other to change the direction of air movement a little less than 180°. The change in direction in the tip 52 is about 150°. Some change in direction occurs in the curved lower tube 48. The curve in the lower tube 48 is selected to accommodate the design of the header 18 the crop lifter assembly 10 is mounted on. The curve is employed that positions the forward tip 52 near the surface of the ground when the header 18 is in the lowest operating position. To obtain the 150° change in the tip 52 an insert is secured in the tip 52 to obtain laminar flow. Laminar flow will reduce the pressure drop through the crop lifter assembly 10. The reduced pressure drop will reduce the load on the pressure blower 16. The insert is secured in place before the upper tube 54 is welded to the lower tube 48.

A crop and vine lifting rod 84 is connected to the top of the second tube 54 of each tubular crop lifter assembly 10 near the forward tip 52. The rod 84 extends rearwardly and upwardly from the second tube of each crop lifter assembly 10 to lift additional crop material forward of the sickle guards 32. The crop lifting rods 84 can be eliminated if not needed or if they interfere with reel bats.

The tubes 12 are attached to the header 18 under the floor 24. The forward ends of the tubes 12 are fixed to a flat bar 70. The flat bar 70 is clamped to the back side of the support bar by bolts. Each tube 12 is in alignment with an aperture 74 through a wall of the support bar 30. The rear end 50 of each lower tube 48 of a crop lifter assembly 10 is aligned with an aperture 74 and with the one of the intermediate tubes 12. The apertures 74 are spaced apart to accommodate a crop lifter assembly 10 on every second forward point end 40 of a sickle guard 32. Some of the apertures 74 can be plugged if fewer crop lifter assemblies are required. A different spacing of the apertures 74 can also be provided in the sickle support bar 30 if desired. Seals (not shown) are provided to prevent air leaks between the intermediate tubes 12 and the lower tubes 48 of the crop lifter assemblies 10. Flexible tubes deliver air from the pressure blower to the intermediate tubes 12.

The intermediate tubes 12 are metal and they are rigidly connected to the header bottom 14. Such construction is used because the intermediate tubes may from time to time contact the ground. It is not unusual for the front wheels of a harvester to sink into mud in a wet field. The lower portion of the header bottom 14 may also sink into the mud. Mud could disconnect flexible tubes that are unprotected. Sharp objects can also damage flexible tubes that are unprotected.

Harvesting headers 110 for crops that are to be severed close to the ground generally have cutter bars 112 that slide along the surface of the ground. To remain in contact with the ground, the cutter bar 112 floats up and down relative to the header frame. Headers with cutter bars 112 that float up and down are well known. Most manufacturers of harvester headers make headers 110 with a floating cutter bar 112. The construction of these headers 110 varies from one manufacturer to another. The headers are referred to as flexible cutter bar headers by some companies and flexible headers by other companies. All of the floating cutter bar, flexible cutter bar, and flexible headers have common features that permit employment of tubular crop lifter assemblies 162 and air assist crop conveying with minimal change from one manufacturer to another.

The cutter bar 112 is flexible in a vertical direction. The cutter bar 112 is relatively rigid in a fore and aft direction. A portion of the flexible cutter bar 112 can be forced up in one area, be lowered in another area and remain in a vertically centered position in a third area simultaneously. The cutter bar 112 remains nearly straight in a fore and aft direction from one side of a header to the other side at the same time there is substantial vertical differences in cutter bar positions.

A plurality of knife guards 118 are clamped to the cutter bar 112 by bolts 120. Each knife guard 118 has two body portions 122 by bolts 120. Each knife guard 118 has two body portions 122 connected together by a connector bar 124. The cutter bar 112 between two knife guards 118 is exposed and permits flexing of the cutter bar 112. A sickle bar 126 passes through a passage 128 through each body portion 122. A plurality of knife sections 130 with cutting edges 132 are attached to the sickle bar 126 by rivets or bolts (not shown). A knife drive (not shown) is connected to one end of the sickle bar 126 on an end of the header 110 and reciprocates the knife sections 130 in and out of the slots 134 through the body portions 122 of the knife guards 118. The cutting edges 132 on the knife sections 130 cooperate with the sides of the body portions 122 adjacent to the slots 128 to shear crop material.

A plurality of skid plate assemblies 136 are attached to the cutter bar 112 by bolts 138. Each skid plate assembly 136 has a steel plate 140 reinforced by at least one rib 142. The rib 142 can be formed into the steel plate 140 by a press or it can be an added member. The steel plate 140 has a flat center section 144, an upturned front section 145 and an upturned rear section 146. A plastic plate member 148 is attached to the bottom surface 150 of the steel plate 140 by rivets 152 or bolts. The plastic plate 148 protects the steel plate 140 from wear, reduces the force required to slide the skid plate assemblies 136 along the surface of a field and prevents soil from sticking to the skid plate. Moist soils and muds in some farm fields tends to stick to steel plates 140 increase in thickness and raises a cutter bar 112 up higher than desired.

A crop feed plate 154 is clamped to the cutter bar 112 by fasteners 156 and a retainer plate 158 and extends rearward from the cutter bar. The retainer plate 158 controls bending of the feed plate 154. The feed plate 154 is a spring steel sheet that cooperates with the header bottom plate 160 to direct crop material into a header conveyor.

The crop lifter and air assist feeding assembly 162 includes a generally horizontal lower tube 164. The tube 164 has an upstanding vertical tongue 166 welded to its mid portion. The vertical tongue 166 has a crop lifter support bore 168 with a generally horizontal fore and aft axis. A threaded nut 170 is welded to an upper surface of the horizontal lower tube 164 adjacent to a rear air inlet collar 172. An upper discharge tube 174 is integral with a forward end of the lower tube 164 adjacent to a rear air inlet collar 172. An upper discharge tube 174 is integral with a forward end of the lower tube 164 and extends upward and rearwardly to an air discharge orifice 176. The upper discharge tube 174 can be welded to the lower tube 164 or the two tubes can be integral with each other. The direction of air flow is changed by around 160° in the connection between the lower tube 164 and the discharge tube 174. If the lower tube 164 and the discharge tube 174 are connected together by welding, an air deflector 178 can be mounted in the connection between the two tubes 164 and 174 to obtain better air flow and to reduce the pressure drop due to the change of directions.

A diffuser 179 is attached to the air assist feeding assembly 162 adjacent to the discharge orifice 176 of the discharge tube 174. Two vertical plates 180 and 182 of the diffuser 179 have their forward ends extending up to the air discharge orifice 176. The two vertical plates 180 and 182 divide the air stream from the discharge tube 174 into three separate air streams. The vertical plates 180 and 182 extend rearwardly from the discharge tube 174, and diverge from each other. A top plate 184 is integral with the upper edge of the vertical plates 180 and 182. A center air stream is directed rearwardly by both vertical plates 180 and 182 and permitted to diffuse to the right and the left. The top plate 184 limits upward diffusion on the center air stream. The left side air stream is directed toward the left end of the header 110 by the vertical plate 180. The top plate 184 does not change the direction of the left side air stream. The right side air stream is directed toward the right end of the header by the vertical plate 182. The top plate 184 does not change the direction of the right side air stream.

A vine lifting rod 186 is connected to the top of the upper discharge tube 174 of each tubular air assist feeding assembly 162. The crop lifting rod 184 extends rearwardly and upwardly from the upper discharge tube 174 to lift additional crop material forward of the knife guards 118.

A terminal air supply tube 190 passes through a passage 192 through the upturned front section 145 of a skid plate assembly 136 and is secured to the skid plate. When the skid plate assembly 136 is clamped to the cutter bar 112 by a nut 194 received on the bolt 138 that passes through an aperture 188, the terminal air supply tube 190 is held in a substantially fixed position relative to the cutter bar 112. The aperture 188 is through a tab 189 on the skid plate assembly 136.

The air inlet flange 172, of a crop lifter and air assist feeding assembly 162, telescopically receives the terminal air supply tube 190. The forward tip 196 on the body portion 122 of a knife guard 118 is received in the crop lifter support bore 168 of the air assist feeding assembly 162. The nut 170 on the air assist feeding assembly 162 receives a bolt 198 that passes through the cutter bar 112 and a knife guard 118. The bolt 198 clamps the knife guard 118 and the air assist feeding assembly 162 to the cutter bar 112.

A blower air delivery tube 200 is secured to the combine header 110 to the rear of the cutter bar 112. Preferably the blower air delivery tubes 200 are connected to a blower through a tubular header frame member 208 near the rear of the header that serves as a manifold. An elastic and flexible tube 202 is connected to an air delivery end 204 of the blower air delivery tube 200 and to the air receiving end 206 of the terminal air supply tube 190. The blower air delivery tube 200 is secured to the combine header below the auger trough and the header bottom plate 160. The terminal air supply tube 190 is connected to one of the skid plate assemblies 136 and the floating cutter bar 112. As the floating cutter bar 112 slides along the ground and moves up and down relative to the header bottom plate 160, the air receiving end 206 of the terminal air supply tube 190 moves relative to the air delivery end 204 of the blower air delivery tube 200. The elastic and flexible tube 202 accommodates both the changes in elevation of the terminal air supply tube 190 and the changes in the distance between the blower air delivery tube 200 and the terminal air tube 190. The flexibility of the elastic and flexible tube 202 accommodates the changes in direction of movement of air through the tube. The elasticity of the elastic and flexible tube 202 permits the changes in the length of the tube. The elastic and flexible tube 202 remains above the skid plate assembly 136 and protected from damage and destruction.

The generally horizontal lower tube 164 of the crop lifter and air assist feeding assembly 162 is in sliding contact with and sliding through soil most of the time during use. By the horizontal lower tube 160 being in the soil, the sickle bar 126 and knife sections 130 cut lower and save more grain. The upper tube 174 and the crop lifting rod 186 are able to lift more crop material if forward tip 196 of the knife guards 118 is closer to the ground.

To extend the life of the crop lifter and air assist feeding assembly 162, the lower portion of the lower tube 164 and the upper portion of the upper discharge tube 174 are protected by a plastic jacket 210. The plastic jacket 210 also reduces the build up of soil that may stick to the assembly 162. Wet or damp soil that sticks to the lower tube or the upper discharge tube 174 could press some crop material to the ground in front of the knife guards 118 and the knife sections. The plastic jacket 210 can be attached to the crop lifter and air assist feeding assembly 162 by an adhesive or by mechanical fasteners.

The disclosed embodiments are representative of a presently preferred form of the invention, but are intended to be illustrative rather than definitive thereof. The invention is defined in the claims.

We claim:

1. A crop lifter and air assist feeding assembly for a floating cutter bar header comprising:

a lower tube that is generally horizontal, an upper tube, integral with a forward end of the lower tube, and extending rearwardly and upwardly from the forward end of the lower tube to an air discharge orifice, a vine lifting rod attached to the upper tube and extending rearwardly and upwardly from the air discharge orifice, a vertical tongue with a crop lifter support bore attached to the lower tube and extending upwardly from the lower tube, a threaded vertical bore integral with a rear portion of the lower tube; and a rear air inlet collar integral with the lower tube, a knife guard with a guard forward tip received in the crop lifter support bore, and a lower tube retainer bolt that passes through a flexible cutter bar, the knife guard and screws into the threaded vertical bore and clamps the lower tube to the cutter bar;

a skid plate assembly clamped to the cutter bar, a terminal air supply tube connected to the skid plate assembly, passing through a passage through an upturned front section of the skid plate assembly and having a terminal air supply forward end telescopically connected to the rear air inlet collar on the lower tube; and an elastic and flexible tube positioned above the skid plate assembly and having a flexible tube forward end connected to an air receiving end of the terminal air supply tube and a flexible tube rear end connected to a blower air delivery tube forward of an upturned rear section of the skid plate assembly.

2. A crop lifter and air assist feeding assembly, as set forth in claim 1 including an air deflector in the forward end of the lower tube that changes the direction of movement of air moving from the lower tube to the upper tube.

3. A crop lifter and air assist feeding assembly, as set forth in claim 1 including a plastic jacket that covers a portion of the downwardly facing outer surfaces of the lower tube and a portion of the upwardly facing outer surface of the upper tube.

4. A crop lifter and air assist feeding assembly, as set forth in claim 1, including a diffuser adjacent to the air discharge orifice that directs the flow of air from the discharge orifice.

5. A crop lifter and air assist feeding assembly for a floating cutter bar header comprising:
  a lower tube that is generally horizontal, an upper tube, integral with a forward end of the lower tube, and extending rearwardly and upwardly from the forward end of the lower tube to an air discharge orifice, a vine lifting rod attached to the upper tube and extending rearwardly and upwardly from the air discharge orifice, a diffuser secured to the lower tube and the upper tube and including a pair of spaced apart vertical plates having their forward ends positioned at the air discharge orifice, extending rearwardly from the air discharge orifice and laterally outward away from each other, a top plate integral with an upper edge of each of the pair of spaced apart vertical plates and extending upward and rearward from the air discharge orifice, a vertical tongue with a crop lifter support bore attached to the lower tube and extending upwardly from the lower tube, and a rear air inlet collar integral with the lower tube;
  a knife guard clamped to a flexible cutter bar with a guard forward tip received in the crop lifter support bore;
  a skid plate assembly clamped to the cutter bar, a terminal air supply tube connected to the skid plate assembly, passing through a passage through an upturned front section of the skid plate assembly and having a terminal air supply forward end telescopically connected to the rear air inlet collar on the lower tube; and
  an elastic and flexible tube positioned above the skid plate assembly and having a flexible tube forward end connected to an air receiving end of the terminal air supply tube and a flexible tube rear end connected to a blower air delivery tube forward of an upturned rear section of the skid plate assembly.

6. A crop lifter and air assist feeding assembly, as set forth in claim 5 including an air deflector in the forward end of the lower tube that changes the direction of movement of air moving from the lower tube to the upper tube.

7. A crop lifter and air assist feeding assembly, as set forth in claim 5 including a plastic jacket that covers a portion of the downwardly facing outer surfaces of the lower tube and a portion of the upwardly facing outer surface of the upper tube.

8. A crop lifter and air assist feeding assembly for a floating cutter bar header comprising:
  a lower tube that is generally horizontal, an upper tube, integral with a forward end of the lower tube, and extending rearwardly and upwardly from the forward end of the lower tube to an air discharge orifice, a vine lifting rod attached to the upper tube and extending rearwardly and upwardly from the air discharge orifice, a diffuser secured to the lower tube and the upper tube and including a pair of spaced apart vertical plates having their forward ends positioned at the air discharge orifice, extending rearwardly from the air discharge orifice and laterally outward away from each other, a top plate integral with an upper edge of each of the pair of spaced apart vertical plates and extending upward and rearward from the air discharge orifice, a vertical tongue with a crop lifter support bore attached to the lower tube and extending upwardly from the lower tube, a threaded vertical bore integral with a rear portion of the lower tube, and a rear air inlet collar integral with the lower tube;
  a knife guard with a guard forward tip received in the crop lifter support bore, and a lower tube retainer bolt that passes through a flexible cutter bar, the knife guard and screws into the threaded vertical bore and clamps the lower tube to the cutter bar;
  a skid plate assembly clamped to the cutter bar, a terminal air supply tube connected to the skid plate assembly, passing through a passage through an upturned front section of the skid plate assembly and having a terminal air supply forward end telescopically connected to the rear air inlet collar on the lower tube; and
  an elastic and flexible tube positioned on an upper side of the skid plate assembly and having a flexible tube forward end connected to an air receiving end of the terminal air supply tube and a flexible tube rear end connected to a blower air delivery tube forward of an upturned rear section of the skid plate assembly.

9. A crop lifter and air assist feeding assembly, as set forth in claim 8 including an air deflector in the forward end of the lower tube that changes the direction of movement of air moving from the lower tube to the upper tube.

10. A crop lifter and air assist feeding assembly, as set forth in claim 8 including a plastic jacket that covers a portion of the downwardly facing outer surfaces of the lower tube and a portion of the upwardly facing outer surface of the upper tube.

11. A crop lifter and air assist feeding assembly, as set forth in claim 8 wherein the threaded vertical bore is a nut fixed to the lower tube.

12. A crop lifter and air assist feeding assembly, as set forth in claim 8 wherein the blower air delivery tube is connected to a header frame member tubular manifold.

* * * * *